US009378037B2

(12) United States Patent
Krishna (10) Patent No.: US 9,378,037 B2
(45) Date of Patent: Jun. 28, 2016

(54) GUEST-BASED QUALITY OF SERVICE FOR ISCSI

(71) Applicant: Emulex Design & Manufacturing Corporation, Costa Mesa, CA (US)

(72) Inventor: Prabal Krishna, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 242 days.

(21) Appl. No.: 14/076,923

(22) Filed: Nov. 11, 2013

(65) Prior Publication Data

US 2015/0089498 A1    Mar. 26, 2015

(30) Foreign Application Priority Data

Sep. 26, 2013 (IN) .......................... 2846/DEL/2013

(51) Int. Cl.
| | |
|---|---|
| *G06F 9/455* | (2006.01) |
| *G06F 9/46* | (2006.01) |
| *G06F 3/00* | (2006.01) |
| *G06F 12/00* | (2006.01) |
| *G06F 7/04* | (2006.01) |

(52) U.S. Cl.
CPC ........ *G06F 9/45545* (2013.01); *G06F 9/45558* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,719,817 B2* | 5/2014 | Aswani | ............... G06F 9/45558 718/1 |
| 2009/0049535 A1* | 2/2009 | Kalman | ................ G06F 21/805 726/8 |
| 2011/0093849 A1* | 4/2011 | Chawla | ............... H04L 41/0816 718/1 |
| 2013/0086583 A1* | 4/2013 | Uemura | .............. G06F 9/45533 718/1 |

* cited by examiner

*Primary Examiner* — Meng An
*Assistant Examiner* — Bing Zhao (57) ABSTRACT

A system and method for providing access to a Logical Unit mapped to an iSCSI target are described herein. In accordance with this disclosure, an initiator IQN name may be split into a physical IQN name (PIN) and a virtual IQN name (VIN). The VIN may be assigned to a virtual adapter that is created in a guest partition. The PIN may be assigned to a physical adapter (e.g., an iSCSI initiator in a hypervisor). The physical adapter may log into the iSCSI target on behalf of the virtual adapter using the VIN. The physical adapter may receive a list of available logical units associated with the iSCSI target and map the list of available logical units to the virtual adapter. Thereafter, a quality of service between the virtual adapter and the iSCSI target may be monitored.

18 Claims, 6 Drawing Sheets

GUEST-BASED QUALITY OF SERVICE FOR ISCSI

FIELD

The disclosure relates to the field of iSCSI (Internet Small Computer System Interface). In particular, but not exclusively, it relates to the application of a quality of service (QoS) in the iSCSI configuration.

CROSS-REFERENCE TO RELATED APPLICATIONS/INCORPORATION BY REFERENCE

This application claims priority to Indian patent application number 2846/DEL/2013, filed Sep. 26, 2013, which is hereby incorporated herein by reference in its entirety.

BACKGROUND

Internet Small Computer System Interface (iSCSI) is an Internet Protocol (IP)-based storage networking standard for linking data storage facilities. By carrying SCSI commands over IP networks, iSCSI is used to facilitate data transfers over intranets and to manage storage over long distances. The iSCSI protocol can be used to transmit data over local area networks (LANs), wide area networks (WANs), or the Internet and can enable location-independent data storage and retrieval. The protocol allows clients (called initiators) to send SCSI commands via Command Descriptor Blocks (CDBs) to SCSI storage devices (targets) on remote servers. The iSCSI protocol is a storage area network (SAN) protocol that is a block storage protocol, allowing organizations to consolidate storage into data center storage arrays while providing hosts (such as database and web servers) with the illusion of locally attached disks.

The Data Center Bridging Exchange (DCBX) standard defined by IEEE describes a method for bandwidth allocation that can be implemented on an iSCSI network link. However, even with the DCBX protocol implemented, the availability of resources on a server may not be visible to a Guest Partition from a client point-of-view.

Furthermore, a unified quality of service (QoS) between the Guest Partition and the server resource is not guaranteed in a configuration implementing the DCBX protocol alone. For example, the client side of a configuration can apply a QoS on its side of the network, but if the server does not guarantee the same QoS parameters, the configuration on the client side may have no effect from an end user perspective.

A logical unit may be a device addressed by a SCSI protocol or protocols which encapsulate SCSI. The SCSI protocol may be, for example, iSCSI. There are different methods of providing direct access to a Logical Unit from a Guest Partition. A software only implementation of an iSCSI Initiator can be run directly on a Guest Partition. However, this option is available only for a software implementation of an iSCSI Initiator.

An iSCSI Initiator running on a Hypervisor can log into the iSCSI target, and the Hypervisor can map the Logical Units to a Guest Partition in pass-through mode. However, using the pass-through mode may prevent the use of additional capabilities that exist in the hardware, therefore limiting the competitive benefit of this option.

A hardware implementation of an iSCSI Initiator can be virtualized by way of storage single root I/O virtualization (SR-IOV), and an iSCSI Login can be directly issued to a Guest Partition completely bypassing the Hypervisor. However, this option is dependent on Hypervisor vendors implementing Storage SR-IOV, which is not widely accepted.

Further limitations and disadvantages of conventional and traditional approaches will become apparent to one of skill in the art, through comparison of such systems with the present disclosure as set forth in the remainder of the present application with reference to the drawings.

BRIEF SUMMARY

Aspects of the present disclosure are aimed at a system and method for providing access to an iSCSI target. In accordance with this disclosure, an initiator IQN name may be split into a physical IQN name (PIN) and a virtual IQN name (VIN). The VIN may be assigned to a virtual adapter that is created in a guest partition. The PIN may be assigned to a physical adapter (e.g., an iSCSI initiator in a hypervisor). The physical adapter may log into the iSCSI target on behalf of the virtual adapter using the VIN. The physical adapter may receive a list of available logical units associated with the iSCSI target and map the list of available logical units to the virtual adapter. Thereafter, a quality of service between the virtual adapter and the iSCSI target may be monitored. The method of partitioning the Initiator IQN name into its physical and virtual parts may be referred to as Initiator IQN Name virtualization or IINV.

One example embodiment of this disclosure comprises a guest partition and a hypervisor. The hypervisor may instantiate a virtual adapter in the guest partition. Upon logging into the iSCSI target, the hypervisor may query the iSCSI target for a list of logical units and attach one or more logical units to the virtual adapter.

In another example embodiment of this disclosure, the guest partition and the hypervisor are elements of a multi-tenant environment comprising a plurality of guest partitions. The multi-tenant environment may achieve traffic isolation at a logical unit level according to an Access Control List (ACL) on the iSCSI target. In addition, a layer-2 packet that originates on behalf of an iSCSI virtual adapter may be tagged with a distinct VLAN ID as per the provisions available in IEEE 802.1Q protocol thus providing additional traffic isolation in a multi-tenant environment.

In another example embodiment of this disclosure, the hypervisor may comprise a storage stack operable to query the iSCSI target for a list of available logical units.

In another example embodiment of this disclosure, a method for providing access to an iSCSI target, may comprise: assigning a virtual IQN name (VIN) to a virtual adapter; logging into the iSCSI target on behalf of the virtual adapter using the VIN; receiving an acceptance response from the iSCSI target; querying the iSCSI target for a list of available logical units; receiving a report from the iSCSI target with the list of available logical units; and mapping the list of available logical units to the iSCSI virtual adapter. An iSCSI initiator on a hypervisor may assign the VIN to the virtual adapter. The iSCSI initiator may also login to the iSCSI Target using the VIN as an initiator name. The storage stack running on the hypervisor may query the iSCSI target for the list of available logical units associated with an access control list. Thereafter, the hypervisor may map the list of available logical units to one or more iSCSI virtual adapters.

In another example embodiment of this disclosure, a system and method operable to provide access to an iSCSI target uses a guest partition and a hypervisor. The guest partition may comprise a virtual adapter. The hypervisor may manage a quality of service between the virtual adapter and the iSCSI target by monitoring the resource usage of the virtual adapter and limiting the flow of inbound and outbound traffic on behalf of the virtual adapter. The quality of service may be initialized and/or updated by one or more quality of service related parameters. Examples of quality of service related parameters may include: a minimum number of input/output operations per second (IOPs); a maximum number of input/output operations per second (IOPs); a minimum throughput; and a maximum throughput.

In another example embodiment of this disclosure, a system and method operable to provide access to an iSCSI target uses a guest partition, a hypervisor and a quality of service manager. The quality of service manager may monitor a quality of service negotiation between a physical adapter on the hypervisor and the iSCSI target. The quality of service negotiation may utilize one or more extension keys as per provisions of RFC 3790 in addition to one or more operational text keys in a login protocol data unit.

BRIEF DESCRIPTION OF SEVERAL VIEWS OF THE DRAWINGS

The disclosure will now be described in greater detail with reference to accompanying figures, in which.

DETAILED DESCRIPTION

This disclosure provides a system and method for end-to-end QoS provisioning in a client-server configuration. The provisioning of (Input/Output Operations per Second) IOPs and Bandwidth parameters may be directly applied to a Virtual Adapter, thus making it visible to a Guest Partition.

With iSCSI Initiators and Targets being developed and manufactured by various vendors, an end-to-end QoS provisioning scheme may be implemented by utilizing the extensions per RFC 3720 to define new QoS specific parameters. This may eliminate the need for a separate QoS management application that interacts with both the iSCSI Initiator and iSCSI Target.

This disclosure also provides systems and methods for virtualizing the iSCSI Initiator in order to provide direct access to the Logical Unit (LU) from a Guest Partition. These systems and methods may not require any changes to the iSCSI protocol as defined in RFC 3720. By using the systems and methods defined in this disclosure, it may be possible to provide complete traffic isolation for each Guest Partition, which may be especially useful in a multi-tenant environment. In addition, for an example embodiment that implements iSCSI Initiator capability in hardware, this disclosure may provide additional application deployment options, since the Logical Unit can be directly mapped to a guest.

This disclosure proposes a mechanism for exporting Logical Units from an iSCSI Target directly into Guest Partitions. Unlike storage SR-IOV which bypasses the Hypervisor completely, the following system may be under the direct control of a Hypervisor. Therefore, this system may seamlessly integrate with storage migration solutions implemented in Hypervisors. This may provide the benefits of traffic isolation both at the Logical Unit and Network Layer level for hardware implementations of the iSCSI protocol.

Figure 1:
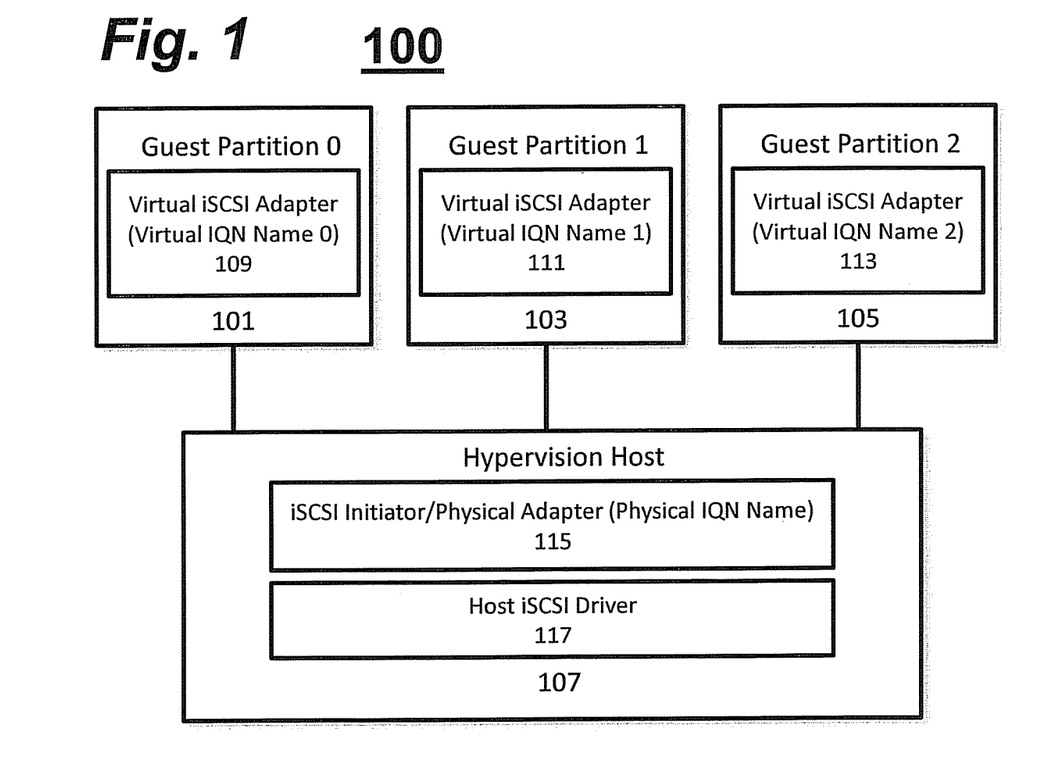
FIG. 1 is a block diagram of an Initiator IQN name virtualization (IINV) platform according to one or more example embodiments of the present disclosure.

FIG. 1 is a block diagram of an Initiator IQN name virtualization (IINV) platform according to one or more example embodiments of the present disclosure. The exemplary IINV platform comprises a Hypervisor Host 107 and three Guest Partitions—Guest Partition 0 (101), Guest Partition 1 (103) and Guest Partition 2 (105). Guest Partition 0 (101) comprises Virtual iSCSI Adapter 109. Guest Partition 1 (103) comprises Virtual iSCSI Adapter 111. Guest Partition 2 (105) comprises Virtual iSCSI Adapter 113. Other example embodiments of the IINV platform may comprise more or fewer Guest Partitions and/or Virtual iSCSI Adapters. The Hypervisor Host 107 comprises an iSCSI Initiator/Physical Adapter 115 and a Host iSCSI Driver 117.

The iSCSI Initiator running on the Hypervisor may be capable of reporting support for an IINV feature. The iSCSI Initiator may allow assignments of the VIN by the Hypervisor; store and retrieve the VIN from a persistent store and delete it from the persistent store on demand. The persistent store that is used to store the VIN may be available across power cycles.

The iSCSI Qualified Name (IQN), as documented in RFC 3720, is a unique name of an iSCSI initiator. The IQN name is split into a physical and logical part by the Hypervisor. The Physical IQN Name (PIN) resides with the iSCSI Initiator 115 running on the Hypervisor Host 107. Each Virtual iSCSI Adapter 109, 111 and 113 is assigned a Virtual IQN Name (VIN).

Figure 2:
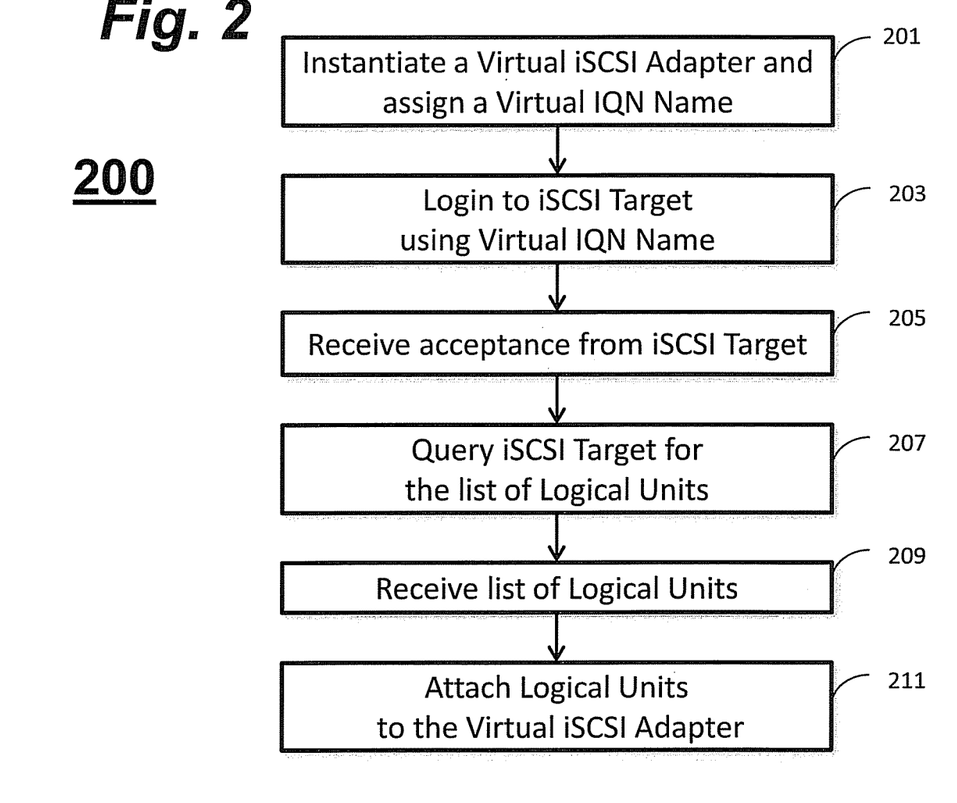
FIG. 2 is a flow diagram of an Initiator IQN name virtualization (IINV) method according to one or more example embodiments of the present disclosure.
Figure 3:
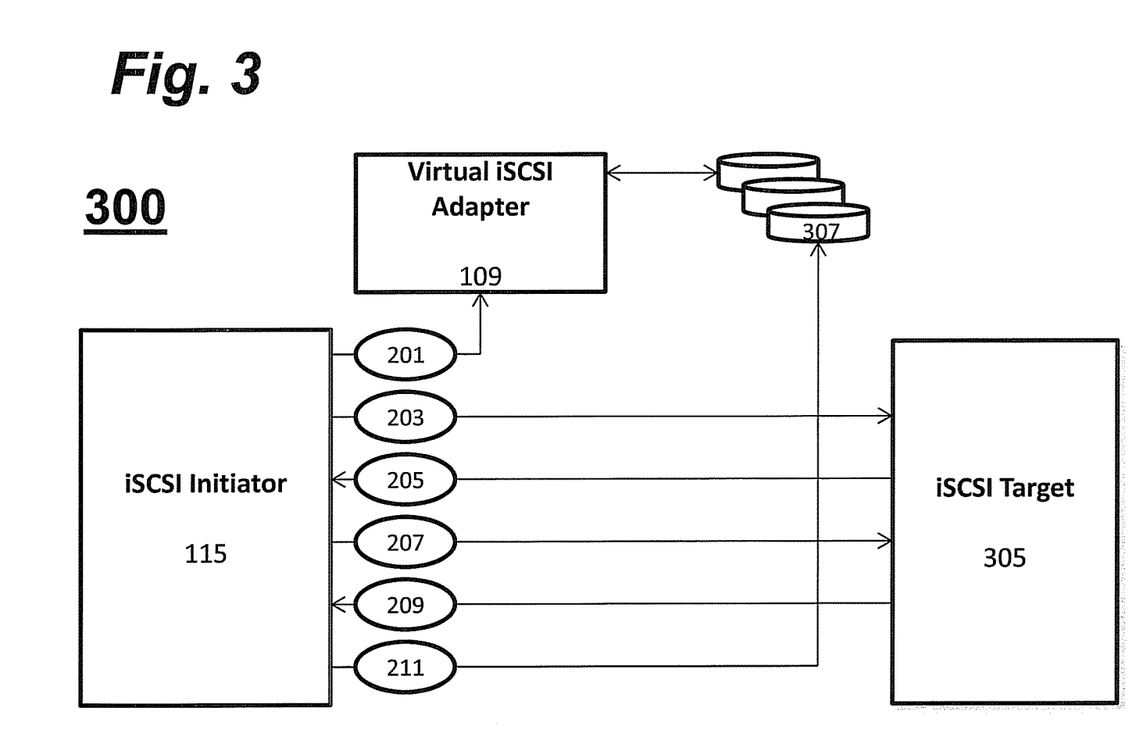
FIG. 3 is a block diagram illustrating where the elements of the IINV method occur according to one or more example embodiments of the present disclosure.

FIG. 2 is a flow diagram of an Initiator IQN name virtualization (IINV) method 200 according to one or more example embodiments of the present disclosure. FIG. 3 is a block diagram illustrating where the elements of the IINV method 200 of FIG. 2 occur according to one or more example embodiments of the present disclosure. As shown in FIG. 3, the iSCSI Initiator 115 creates the Virtual iSCSI Adapter 109 within the Guest Partition 101 of FIG. 1. The iSCSI Initiator 115 assigns a Virtual IQN Name (VIN) to the instantiated Virtual iSCSI Adapter 109 at block 201 of FIGS. 2 and 3. There are several methods that may be invoked in accordance with block 201 of FIGS. 2 and 3. These methods comprise: QueryINNVCapability, QueryInstances, CreateInstance and DeleteInstance.

The QueryINNVCapability method may be invoked by the Hypervisor at startup or whenever a new iSCSI Initiator arrives on the system. The following are the operations that occur in the QueryINNVCapability method. First, the Hypervisor queries the iSCSI initiator to determine whether it supports Initiator IQN Name Virtualization (IINV) capability. If the IINV capability is supported by the iSCSI initiator running on the Hypervisor, the iSCSI Initiator may return TRUE and also may return a count of the maximum number of VINs that can be supported by the iSCSI initiator.

The QueryInstances method may be invoked by the Hypervisor after it determines that the iSCSI initiator has the IINV capability. The following are example operations that occur in the QueryInstances method. First, the Hypervisor queries the iSCSI initiator for a list of VIN already created on the iSCSI Initiator. In response to the query, the iSCSI Initiator consults its persistent store and returns all the VINs created on the iSCSI Initiator.

The CreateInstance method may be invoked by the Hypervisor whenever there is a request to create a new Virtual iSCSI Adapter on behalf of a Guest Partition. The following are example operations that occur in the CreateInstance method. The Hypervisor checks if the number of VIN+1 will not exceed the maximum number of VINs that can be created on the iSCSI Initiator. If the number, VIN+1, will not exceed the maximum count allowed, the Hypervisor may generate a new VIN that is unique across all instances of VINs on the Hypervisor. The Hypervisor may assign the VIN via the iSCSI Initiator. The iSCSI Initiator may store the VIN in its persistent store and may increment the count of the number of VINs it has been assigned.

The DeleteInstance method may be invoked by the Hypervisor whenever there is a request to delete an existing Virtual iSCSI Adapter from a Guest Partition. The following are example operations that occur in the DeleteInstance method. The Hypervisor de-assigns the VIN via the iSCSI Initiator. The iSCSI Initiator deletes the VIN from its persistent store and decrements the count of the number of VINs it has been assigned currently.

Following the instantiation of the Virtual iSCSI Adapter 109 at block 201 of FIGS. 2 and 3, the iSCSI initiator 115 may operate on behalf of the Virtual iSCSI Adapter 109. When the iSCSI initiator 115 running on the Hypervisor 107 does an iSCSI login at block 203 of FIGS. 2 and 3 to an iSCSI Target 305 on behalf of a Virtual iSCSI Adapter 109, the iSCSI initiator 115 may use the VIN as the Initiator Name in the iSCSI Login Protocol Data Unit (PDU). After the iSCSI target 305 accepts the login request and the logical relationship between an Initiator and a Target (the I_T nexus) gets established, the iSCSI initiator 115 running in the Hypervisor 107 will receive an acceptance response from the iSCSI Target at block 205. A storage stack running on the Hypervisor 107 may then query the iSCSI target 305 for a list of available Logical Units at block 207. At 209, the iSCSI Initiator may receive a report back from the iSCSI Target 305 with the list of Logical Units per the Access Control List at block 209. The Hypervisor may map the list of available Logical Units 307 to one or more iSCSI Virtual Adapters at block 211. A Logical Unit 307 may therefore be directly available to the Guest Partition 101.

Figure 4:
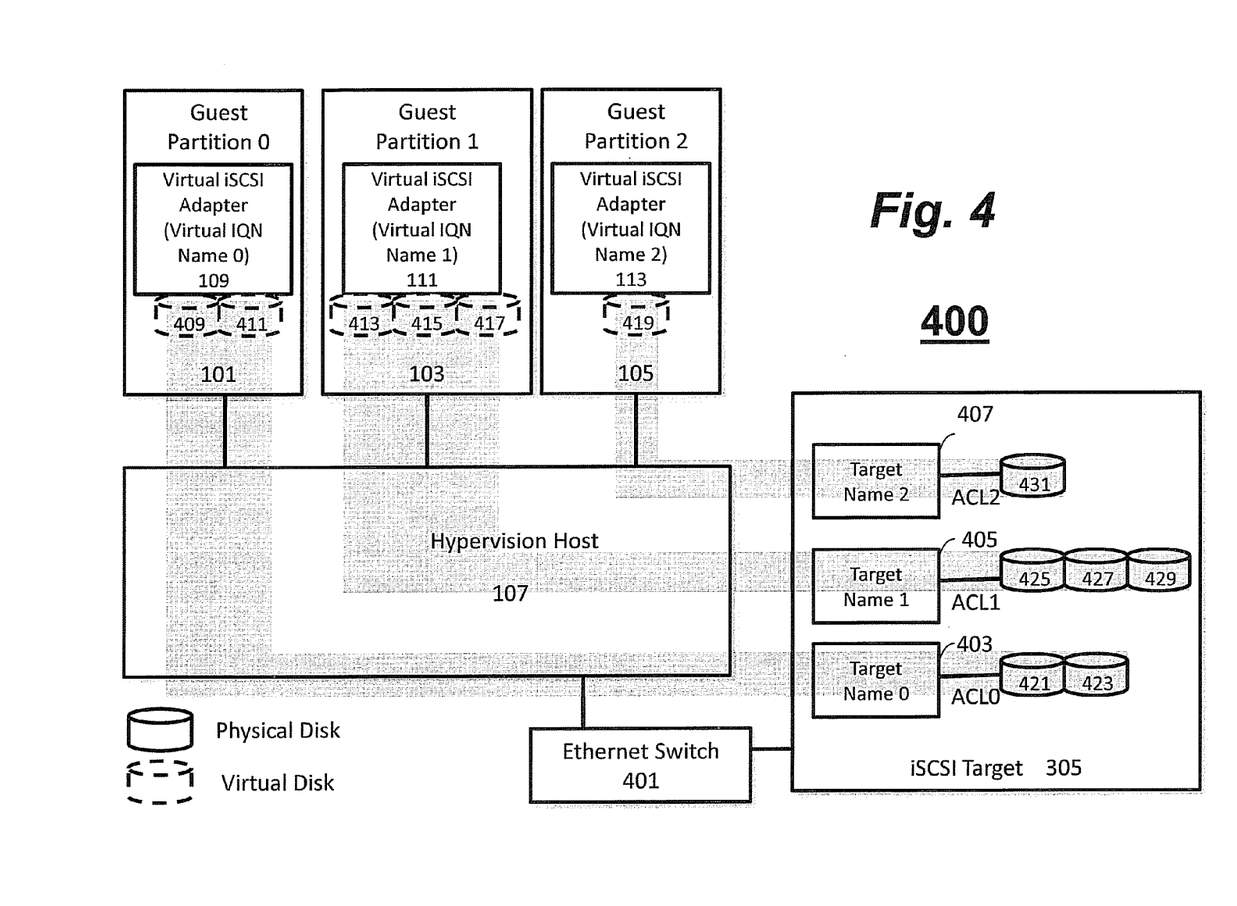
FIG. 4 is a block diagram of an iSCSI SAN configuration according to one or more example embodiments of the present disclosure.

FIG. 4 is a block diagram of an iSCSI storage area network (SAN) configuration according to one or more example embodiments of the present disclosure. The example iSCSI SAN configuration comprises different Logical Units mapped to their respective Guest Partitions depending on the Access Control List (ACL) setup on the iSCSI target 305.

For the example in FIG. 4, Target Name_0 (403) is coupled by the ACL to one or more Logical Units comprising physical disks 421 and 423. The Guest Partition_0 (101) is able to access the physical disks 421 and 423 via virtual disks 409 and 411. Likewise, Guest Partition_1 (103) is able to access the physical disks 425, 427 and 429 via virtual disks 413, 415 and 417, and Guest Partition_2 (105) is able to access the physical disk 431 via virtual disk 419.

Since the iSCSI initiator running on the Hypervisor logs into the target using different VINs, each Guest Partition can only access the Logical Units mapped to it via the target side ACL. This achieves traffic isolation at the Logical Unit level.

FIG. 4 also illustrates how traffic isolation may be achieved at a network layer by means of VLAN IDs as defined in the IEEE 802.1Q standard according to one or more example embodiments of the present disclosure. The iSCSI Initiator running on the Hypervisor ensures that iSCSI storage traffic originating from a different Virtual IQN Name (VIN) may be tagged with a different VLAN ID. Therefore the traffic from different Guest Partitions is completely isolated from one another as illustrated by the grey paths for example.

Figure 5:
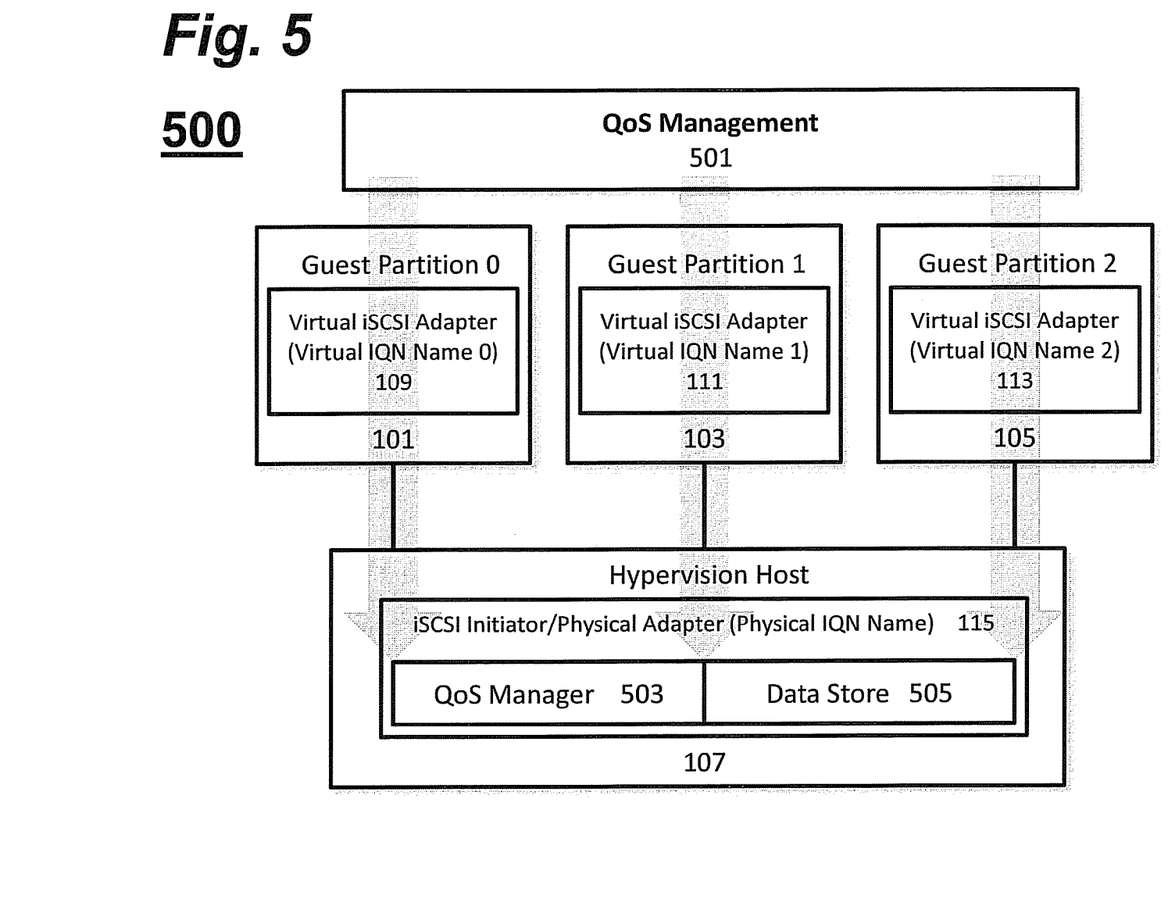
FIG. 5 illustrates a SAN Configuration with an Initiator Layer/Physical Adapter running on a Hypervisor according to one or more example embodiments of the present disclosure.

Typically in a Converged Network Adapter (iSCSI/FCoE) based SAN, bandwidth provisioning is implemented at a network link level. However, in a virtualized environment, there is no direct visibility into how much bandwidth or IOPs is available to an individual Guest Partition. This disclosure proposes a method for applying QoS provisioning directly to a Guest Partition by assigning bandwidth and IOPs parameters directly to Guest Partitions via a Virtual Adapter FIG. 5 shows a SAN Configuration with an Initiator Layer/Physical Adapter 115 running on a Hypervisor 107. The Hypervisor exports a Virtual Adapter 109, 111 and 113 for every Guest Partition 101, 103 and 105 respectfully. The Virtual Adapters 109, 111 and 113 are a logical abstraction of an Initiator and can be implemented by one or more of the following ways: 1) SR-IOV/MR-IOV PCI Express endpoint that can act as an Initiator; 2) a virtualized iSCSI Adapter exported via the Initiator IQN Name Virtualization (INNV) method as described with respect to FIG. 1; and 3) a virtualized FCoE Adapter exported via the NPIV method as defined in the T11 Fibre Channel—Link Specification (FC-LS) standard.

Referring to FIG. 5 and FIG. 1, the Hypervisor 107 is an entity that may implement a Virtual Machine Manager. A Hypervisor 107 may also host the Initiator Layer and/or Physical Adapter 115. The Hypervisor 107 may be operable to create Virtual Adapters 109, 111 and 113 on behalf of a Guest Partition and attach the Virtual Adapter to the Guest Partition 101, 103 and 105 respectfully. If the Guest Partition is not capable of running the Initiator service directly, the Hypervisor may determine the Logical Units attached behind a Target device and assigns it to the Guest Partition. The Hypervisor 107 may also establish a communication path between the Virtual Adapter 109, 111 and 113 running on the Guest Partition 101, 103 and 105 respectively and the Initiator Layer/Physical Adapter 115 running on the Hypervisor 107 for flow of storage related SCSI commands and management IOCTLs.

The Initiator Layer/Physical Adapter 115 running on the Hypervisor 107 contains a QoS Manager 503 that implements support for the management of Virtual Adapters 109, 111 and 113. The Virtual Adapters 109, 111 and 113 support setting the following QoS related parameters per Guest Partition: 1) Minimum IOPs; 2) Maximum IOPs; 3) Minimum Throughput; and 4) Maximum Throughput. These QoS parameters can be setup at the time of creating the Virtual Adapter and can be modified at a later point on demand.

The Initiator Layer/Physical Adapter 115 supports the following operations on each Virtual Adapter QoS parameter on demand: 1) store parameters in a persistent Data Store 505; 2) retrieve parameters; 3) modify parameters; and 4) delete parameters from the Data Store 505.

The Data Store 505 that may be used to store this configuration must be available across power cycles. In addition to enforcing the QoS parameters, the Initiator Layer/Physical Adapter 115 can also monitor the resource usage on a per-Virtual Adapter basis and can report the following statistics via a QueryStatistics operation: 1) Max IOPs; 2) Max Throughput; 3) Average IOPs; 4) Average Throughput; 5) Bytes Transmitted; and 6) Bytes Received.

Hypervisors or QoS Management module 501 can query the Initiator Layer/Physical Adapter 115 and determine the resource usage on a per-Virtual Adapter basis.

QoS Management module 501 may interact with the Hypervisor 107 and assigns IOPs and Bandwidth parameters to a Virtual Adapter. The Hypervisor may pass these parameters to the Physical Adapter/Initiator Layer 115. The Physical Adapter/Initiator Layer 115 may accept these QoS parameters and save them in the data store 505.

The Physical Adapter/Initiator Layer 115 limits the flow of inbound and outbound traffic on behalf of the Virtual Adapter as per its QoS settings. Since there could be multiple traffic flows within a single Virtual Adapter (e.g. multiple TCP/IP connections), the Physical Adapter/iSCSI Initiator Layer 115 accounts for traffic across all these connections when applying the QoS parameters, since the Physical Adapter/Initiator Layer can monitor the resource usage on a per-Virtual Adapter instance basis.

By providing visibility into the QoS provisioning for Guest Partitions, it may be possible to determine the storage resource allocated to a Guest Partition. Therefore, data center administrators may provision their storage resource directly to Guest Partitions. In addition, the resource monitoring and chargeback schemes implemented by various vendors can also be simplified with this visibility into the QoS provisioning. Data center administrators may design and implement Service-Level Agreements (SLAs) where QoS is determined based on the data usage (in Bytes as well as Byte rate) by Guest Partitions.

The aforementioned traffic isolation provides an end-to-end unified scheme of applying QoS parameters in an iSCSI SAN. The unified scheme of applying QoS parameters is achieved by allowing both the iSCSI Initiator (e.g. physical adapter) and the iSCSI Target to participate in the QoS negotiation. Instead of having separate QoS applications for an Initiator and Target, this disclosure utilizes the extensions defined in iSCSI RFC 3720 so that there is a unified method of resource provisioning across both entities. QoS management software can be developed that has the whole SAN view of QoS settings instead of just the initiator or target side view. Since the Initiators and Targets participate in negotiating for the QoS parameters, the QoS Management module 501 and/or the QoS manager 503 can get immediate feedback on the QoS being provisioned.

The QoS negotiation may utilize new public extension keys in addition to the Login/Text Operational Text Keys in an iSCSI Login PDU. These additional keys are sent during operational parameter negotiation in the iSCSI Login phase. The iSCSI Initiator communicates its QoS parameters to an iSCSI Target via these extension keys. A participating iSCSI target looks at these extension keys and applies the QoS parameters on its side of the network.

Figure 6:
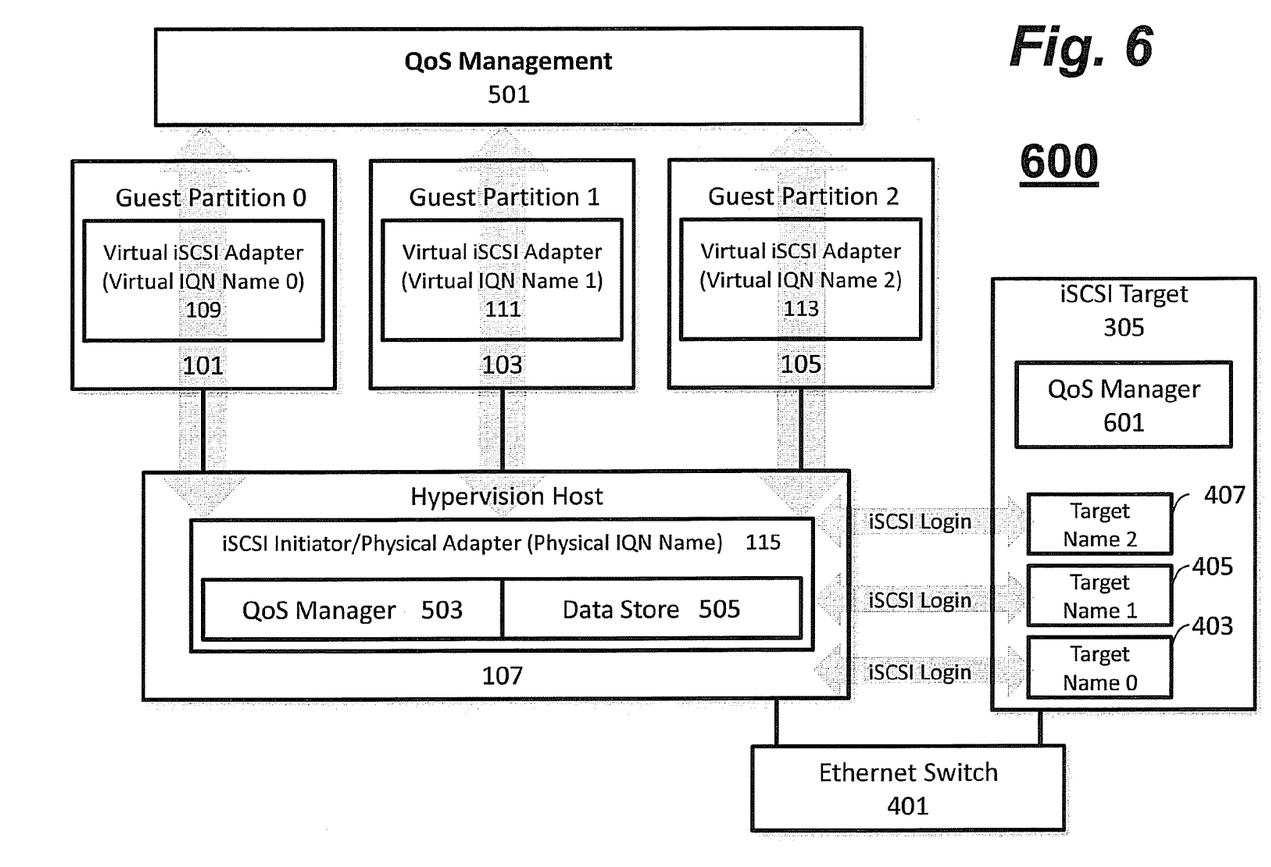
FIG. 6 illustrates communication between the iSCSI Target and the iSCSI Initiator according to one or more example embodiments of the present disclosure.

FIG. 6 illustrates communication between the iSCSI Target and the iSCSI Initiator according to one or more example embodiments of the present disclosure. Changes if any are communicated from the iSCSI Target back to the iSCSI Initiator during the Login exchange. The iSCSI Initiator 115 responds to changes if any by configuring the QoS parameters on its side of the network. QoS Management module 501 and/or 601 may query for the updated QoS parameters from the iSCSI Initiator 115 at the end of the Login sequence.

The iSCSI protocol may be extended to implement end-to-end iSCSI provisioning by defining extensions to Text and Operational Keys for the iSCSI Login PDU for QoS. The key format follows the Public Extension Key format as defined in RFC 3720, X<#><IANA-registered-string>.

For example, a first extension may be a Boolean key with the registered string "iSCSIQoS." When the iSCSI Initiator and iSCSI Target negotiate support for end-to-end QoS provisioning, the iSCSI Initiator may set the iSCSIQoS key value to Yes to indicate support for QoS on its side. If the iSCSI Target supports QoS and is willing to participate in QoS, it must also set iSCSIQoS to Yes in the iSCSI Login Response. If it is incapable or unwilling to participate in the QoS scheme, it must set iSCSIQoS to No. QoS is enabled if both iSCSI Initiator and iSCSI Target have set X#iSCSIQoS=Yes. If the key X#iSCSIQoS=Yes has been set, then the rest of the QoS related parameters must be present and valid.

If iSCSI Initiator and iSCSI Target negotiate support for specifying the limits of Input/Output Operations per Second (IOPs), the additional extensions may comprise two 32-bit values to specify a minimum and maximum IOPs. For example, the registered string "QoSMinIOPs" may be used to represent the minimum IOPs available for bi-directional traffic between the initiator and target. Likewise, the registered strings "QoSMaxIOPs" may be used to represent the maximum IOPs available for bi-directional traffic between the initiator and target. The iSCSI Initiator and iSCSI Target may negotiate for the number of IOPs supported. This number must be greater than or equal to the X#QoSMinIOPs parameter and less than or equal to the X#QoSMaxIOPs parameter.

If iSCSI Initiator and iSCSI Target negotiate support for throughput in units of MBps (MegaBytesPerSecond), the additional extensions may comprise two 32-bit values to specify a minimum and maximum MBps. For example, the registered string "QoSMinMBps" may be used to represent the minimum MBps available for bi-directional traffic between the initiator and target. Likewise, the registered strings "QoSMaxMBps" may be used to represent the maximum MBps available for bi-directional traffic between the initiator and target. The iSCSI Initiator and iSCSI Target may negotiate for the throughput supported. This number must be greater than or equal to the X#QoSMinMBps parameter and less than or equal to the X#QoSMaxMBps parameter.

One example embodiment of this disclosure comprises a first system operable to provide access to an iSCSI target, comprising: a guest partition comprising a virtual adapter; and a hypervisor operable to manage a quality of service between the virtual adapter and the iSCSI target. The hypervisor, in the first system, may be operable to instantiate the virtual adapter in the guest partition. The hypervisor, in the first system, may be operable to control one or more quality of service related parameters. The one or more quality of service related parameters may control a number of operations per second. The one or more quality of service related parameters may control a throughput, for example. The hypervisor, in the first system, may be operable to set a minimum quality of service related parameter and a maximum quality of service related parameter. The hypervisor, in the first system, may be operable to manage a quality of service for a plurality of virtual adapters. The hypervisor, in the first system, may be operable to update one or more quality of service parameters after creating the virtual adapter. The hypervisor, in the first system, may comprise a physical adapter that is operable to monitor the resource usage of the virtual adapter. The hypervisor, in the first system, may comprise an adapter that is operable to limit the flow of inbound and outbound traffic on behalf of the virtual adapter.

Another example embodiment of this disclosure comprises a first method operable to provide access to an iSCSI target, comprising: creating a virtual adapter in a guest partition; and managing a quality of service between the virtual adapter and the iSCSI target. In the first method, a hypervisor may be operable to create the virtual adapter in the guest partition. The first method may comprise setting one or more quality of service related parameters. The one or more quality of service related parameters may control a number of operations per second. The one or more quality of service related parameters may control a throughput, for example. In the first method, a hypervisor may be operable to set a minimum quality of service related parameter and a maximum quality of service related parameter. In the first method, a hypervisor may be operable to manage a quality of service for a plurality of virtual adapters. The first method may comprise updating one or more quality of service parameters after creating the virtual adapter. The first method may comprise monitoring the resource usage of the virtual adapter. The first method may comprise limiting the flow of inbound and outbound traffic on behalf of the virtual adapter.

Another example embodiment of this disclosure comprises a second system operable to provide access to an iSCSI target, comprising: a guest partition comprising a virtual adapter; a hypervisor comprising a physical adapter operable to communicate with the iSCSI target on behalf of the virtual adapter; and a quality of service manager operable to monitor a quality of service negotiation between the physical adapter and the iSCSI target. The negotiation, in the second system, may utilize one or more extension keys in addition to one or more operational text keys in a login protocol data unit. The hypervisor, in the second system, may be operable to control one or more quality of service related parameters. The one or more quality of service related parameters may control a number of operations per second. The one or more quality of service related parameters may control a throughput, for example. The hypervisor, in the second system, may be operable to set a minimum quality of service related parameter and a maximum quality of service related parameter. The hypervisor, in the second system, may be operable to manage a quality of service for a plurality of virtual adapters. The hypervisor, in the second system, may be operable to update one or more quality of service parameters after creating the virtual adapter. The hypervisor, in the second system, may comprise a physical adapter that is operable to monitor the resource usage of the virtual adapter. The hypervisor, in the second system, may comprise an adapter that is operable to limit the flow of inbound and outbound traffic on behalf of the virtual adapter.

Another example embodiment of this disclosure comprises a second method operable to provide access to an iSCSI target, comprising: creating a virtual adapter in a guest partition, wherein the virtual adapter is operable to communicate with the iSCSI target via a hypervisor comprising a physical adapter; and monitoring a quality of service negotiation between the physical adapter and the iSCSI target. In the second method, the negotiation may utilize one or more extension keys in addition to one or more operational text keys in a login protocol data unit. The second method may comprise setting one or more quality of service related parameters. The one or more quality of service related parameters may control a number of operations per second. The one or more quality of service related parameters may control a throughput, for example. In the second method, the hypervisor may be operable to set a minimum quality of service related parameter and a maximum quality of service related parameter. In the second method, the hypervisor may be operable to manage a quality of service for a plurality of virtual adapters. The second method may comprise updating one or more quality of service parameters after creating the virtual adapter. The second method comprises monitoring the resource usage of the virtual adapter. The second method comprises limiting the flow of inbound and outbound traffic on behalf of the virtual adapter.

The present disclosure may be embedded in a computer program product, which comprises all the features enabling the implementation of the example embodiments described herein, and which when loaded in a computer system is able to carry out these example embodiments. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain example embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular example embodiment disclosed, but that the present disclosure will include all example embodiments falling within the scope of the appended claims.

What is claimed is:

1. A non-transitory machine-readable medium storing instructions that, when executed by one or more processors, provide a system operable to access an Internet Small Computer Systems Interface (iSCSI) target, the system comprising:
   a guest partition; and
   a hypervisor that instantiates a virtual adapter in the guest partition, splits an iSCSI Qualified Name (IQN) into a physical IQN and a virtual IQN, assigns the physical IQN to a physical adapter under control of the hypervisor, assigns the virtual IQN to the virtual adapter, logs in to the iSCSI target with the virtual IQN via the physical adapter, and establishes a link between the iSCSI target and the physical adapter after the login,
   wherein:
   the hypervisor directs the physical adapter to negotiate a Quality of Service (QoS) with the iSCSI target on behalf of the virtual adapter, to monitor the QoS of the virtual adapter, and to limit a number of Input/Output operations per second (IOPs) by the virtual adapter when the IOPs begin to exceed the negotiated QoS.

2. The system of claim 1, wherein:
   the hypervisor is operable to query the iSCSI target for a list of logical units.

3. The system of claim 1, wherein:
   the hypervisor is operable to attach one or more logical units to the virtual adapter.

4. The system of claim 1, wherein:
   a logical unit is mapped to the guest partition according to an Access Control List (ACL) on the iSCSI target.

5. The system of claim 1, wherein:
   the hypervisor comprises an iSCSI initiator.

6. The system of claim 5, wherein:
   the physical IQN is assigned to the iSCSI initiator.

7. The system of claim 1, wherein:
   one or more logical units are exported to the guest partition.

8. The system of claim 1, wherein:
   the guest partition and the hypervisor are elements of a multi-tenant environment comprising a plurality of guest partitions.

9. The system of claim 8, wherein:
   the multi-tenant environment is operable to achieve traffic isolation at a logical unit level according to an Access Control List (ACL) on the iSCSI target and to achieve traffic isolation at a network layer level by way of a plurality of distinct Virtual Local Area Network (VLAN) identification tags for traffic from a plurality of different virtual adapters.

10. The system of claim 1, wherein:
the hypervisor comprises a storage stack operable to query the iSCSI target for a list of available logical units.

11. A method operable with a hypervisor for providing access to an Internet Small Computer Systems Interface (iSCSI) target, the method comprising:
instantiating a virtual adapter in a guest partition;
splitting an iSCSI Qualified Name (IQN) into a physical IQN and a virtual IQN;
assigning the physical IQN to a physical adapter under control of the hypervisor;
assigning the virtual IQN to the virtual adapter;
logging in to the iSCSI target with the virtual IQN via the physical adapter;
establishing a link between the iSCSI target and the physical adapter after the login;
directing the physical adapter to negotiate a Quality of Service (QoS) with the iSCSI target on behalf of the virtual adapter;
monitoring the QoS of the virtual adapter; and
limiting a number of Input/Output operations per second (IOPs) by the virtual adapter when the IOPs begin to exceed the negotiated QoS.

12. The method of claim 11, further comprising:
assigning the virtual IQN to the virtual adapter via an iSCSI initiator of the hypervisor.

13. The method of claim 11, further comprising:
logging in to the iSCSI target using the virtual IQN as an initiator name via an iSCSI initiator of the hypervisor.

14. The method of claim 11, further comprising:
receiving an acceptance response from the iSCSI target via an iSCSI initiator of the hypervisor.

15. The method of claim 11, further comprising:
querying the iSCSI target for a list of available logical units via a storage stack running on the hypervisor.

16. The method of claim 15, wherein:
the list of available logical units is associated with an Access Control List (ACL).

17. The method of claim 15, further comprising:
mapping the list of available logical units to one or more iSCSI virtual adapters via the hypervisor.

18. The method of claim 11, further comprising:
assigning the physical IQN to an iSCSI initiator of the hypervisor.

* * * * *